US011555127B2

(12) United States Patent
Moravek et al.

(10) Patent No.: US 11,555,127 B2
(45) Date of Patent: Jan. 17, 2023

(54) CURABLE FILM-FORMING COMPOSITIONS COMPRISING CATALYST ASSOCIATED WITH A CARRIER AND METHODS FOR COATING A SUBSTRATE

(71) Applicant: PPG INDUSTRIES OHIO, INC., Cleveland, OH (US)

(72) Inventors: Scott J. Moravek, Mars, PA (US); Davina J. Schwartzmiller, Rural Valley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 115 days.

(21) Appl. No.: 16/908,190

(22) Filed: Jun. 22, 2020

(65) Prior Publication Data

US 2021/0009821 A1 Jan. 14, 2021

Related U.S. Application Data

(62) Division of application No. 14/075,288, filed on Nov. 8, 2013, now abandoned.

(51) Int. Cl.
| | |
|---|---|
| C08K 9/10 | (2006.01) |
| C09D 7/40 | (2018.01) |
| C08J 3/24 | (2006.01) |
| C09D 7/65 | (2018.01) |
| C09D 175/04 | (2006.01) |
| C08G 18/24 | (2006.01) |
| C09D 5/02 | (2006.01) |
| C09D 7/62 | (2018.01) |
| C09D 175/02 | (2006.01) |
| C09D 189/00 | (2006.01) |
| B05D 1/02 | (2006.01) |
| C09D 175/14 | (2006.01) |
| B05D 1/36 | (2006.01) |
| B05D 3/12 | (2006.01) |

(52) U.S. Cl.
CPC .............. *C09D 7/70* (2018.01); *B05D 1/02* (2013.01); *C08G 18/246* (2013.01); *C08J 3/241* (2013.01); *C08K 9/10* (2013.01); *C09D 5/024* (2013.01); *C09D 7/62* (2018.01); *C09D 7/65* (2018.01); *C09D 175/02* (2013.01); *C09D 175/04* (2013.01); *C09D 175/14* (2013.01); *C09D 189/00* (2013.01); *B05D 1/36* (2013.01); *B05D 3/12* (2013.01); *C08J 2361/24* (2013.01); *Y10T 428/31768* (2015.04); *Y10T 428/31942* (2015.04)

(58) Field of Classification Search
CPC ... B05D 1/02; B05D 1/36; B05D 3/12; C08G 18/246; C08J 3/241; C08J 2361/24; C08K 9/10; Y10T 428/31768; Y10T 428/31942
USPC ...................................................... 427/421.1
See application file for complete search history.

(56) References Cited

U.S. PATENT DOCUMENTS

| | | | |
|---|---|---|---|
| 38,650,565 | | 1/1975 | Barber, Jr. |
| 3,963,680 | A | 6/1976 | O'Keefe et al. |
| 4,076,774 | A | 2/1978 | Short |
| 4,252,708 | A | 2/1981 | Newell |
| 5,726,456 | A | 3/1998 | Lupton et al. |
| 6,013,698 | A | 1/2000 | Lupton et al. |
| 6,262,152 | B1 | 7/2001 | Fryd et al. |
| 6,559,223 | B2 * | 5/2003 | Green .................... C08F 2/10 524/916 |
| 2002/0077410 | A1 * | 6/2002 | Harakawa .......... C09D 133/064 427/407.1 |
| 2002/0132934 | A1 * | 9/2002 | Huynh-Ba .......... C08G 18/6535 525/453 |
| 2004/0157002 | A1 | 8/2004 | Bons et al. |
| 2005/0234194 | A1 | 10/2005 | Saiga et al. |
| 2006/0073334 | A1 | 4/2006 | Schwantes |
| 2007/0173602 | A1 | 7/2007 | Brinkman et al. |
| 2008/0182943 | A1 | 7/2008 | Goetter et al. |
| 2011/0002831 | A1 | 1/2011 | Arfsten et al. |
| 2011/0009517 | A1 | 1/2011 | Tamai |
| 2011/0104495 | A1 | 5/2011 | Lalgudi et al. |
| 2011/0114260 | A1 | 5/2011 | Sjong |
| 2011/0236498 | A1 | 9/2011 | Marteaux et al. |
| 2012/0199671 | A1 | 8/2012 | De Schrijver et al. |
| 2013/0017405 | A1 | 1/2013 | Benkoski et al. |
| 2013/0085222 | A1 | 4/2013 | Fasano et al. |

FOREIGN PATENT DOCUMENTS

| | | |
|---|---|---|
| CA | 2341977 | 2/2001 |
| EP | 1348742 A2 | 10/2003 |
| EP | 1953199 A1 | 8/2008 |
| GB | 1201902 A | 8/1970 |
| GB | 1482545 A | 8/1977 |

(Continued)

OTHER PUBLICATIONS

Carlton et al., "Microencapsulated Catalyst and Energetic Compound Containing Same", United States Statutory Invention Registration No. H778, May 11, 1990, USA.

*Primary Examiner* — Hannah J Pak

(74) *Attorney, Agent, or Firm* — Krisanne Shideler

(57) ABSTRACT

Methods of coating a substrate are disclosed. The methods comprise applying shear force to a coating composition either before or during application of the coating composition to the substrate. The coating composition comprises a water-borne or solvent-borne film-forming resin and a catalyst associated with a carrier, wherein at least some of the catalyst can be released from the carrier upon application of the shear force. Also provided are coated articles prepared by the methods.

10 Claims, No Drawings

(56) References Cited

FOREIGN PATENT DOCUMENTS

| | | |
|---|---|---|
| JP | 2983234 B2 | 11/1999 |
| JP | 2001048903 B1 | 2/2001 |
| JP | 4102274 B | 3/2008 |
| WO | WO 9002655 A1 | 3/1990 |
| WO | WO 9315131 | 8/1993 |
| WO | WO 2000015694 A2 | 3/2000 |
| WO | WO 02085540 A1 | 10/2002 |
| WO | WO 2006121609 A1 | 11/2006 |
| WO | WO 2012151357 A2 | 11/2012 |
| WO | WO 2012151409 A2 | 11/2012 |

\* cited by examiner

CURABLE FILM-FORMING COMPOSITIONS COMPRISING CATALYST ASSOCIATED WITH A CARRIER AND METHODS FOR COATING A SUBSTRATE

CROSS-REFERENCE TO RELATED APPLICATIONS

This patent application is a Divisional of U.S. patent application Ser. No. 14/075,288, filed Nov. 8, 2013, entitled: "CURABLE FILM-FORMING COMPOSITIONS COMPRISING CATALYST ASSOCIATED WITH A CARRIER AND METHODS FOR COATING A SUBSTRATE", the entirety of which is incorporated herein by reference.

FIELD OF THE INVENTION

The present invention relates to coating compositions that comprise a film-forming resin and a catalyst associated with a carrier, as well as methods for coating a substrate and coated substrates.

BACKGROUND INFORMATION

Coatings have been used in various industries for a wide range of metallic and non-metallic substrates. Certain coatings, particularly in the refinish industry, must be provided as two or more components that are maintained separately until just prior to application since the components will begin to react upon contact. The practice of supplying coatings as two or more separate components is common where ambient or moderate cure temperature is required. Examples include polyisocyanates and polyols, polyepoxides and polyamines, and polyanhydrides and polyols. In the Automotive Refinish Industry for example, a polyol and catalyst are typically supplied as one coating component and a polyisocyanate is supplied as the other coating component. These components are then weighed, mixed, sprayed on to an automobile and allowed to cure to form a polyurethane coating.

The two component approach presents several challenges when applying a coating. One is the need to accurately weigh each component so the reactive groups, such as the isocyanate and hydroxyl groups, are in an acceptable ratio. Another is the need to work in a timely manner so that the mixed components maintain a low enough viscosity for spraying. The span of time during which the coating is ready to apply and still of low enough viscosity to be applied is commonly referred to as "pot life."

Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot-life is needed less catalyst can be used but the cure speed would also be retarded.

It is also important that the applied coating composition dry and harden quickly so that dirt pick-up is minimized and valuable shop space isn't occupied with the coated substrate, such as an automobile, while it is drying. The length of time between when a coating is applied to a substrate and when the coating has dried or cured sufficiently that dust falling onto the coated substrate will not stick to the coated substrate is referred to as "dust-free time" and is an indicator of the speed of cure. One way to speed the drying and cure of the composition is to add additional catalyst, but this shortens the time available for spraying since higher catalyst levels also cause viscosity of the composition to increase more quickly.

Therefore, it would be desirable to have a coating system for use at ambient temperature where the pot life and cure speed may be better controlled.

SUMMARY OF THE INVENTION

Various examples of the present invention are directed to a coating composition comprising a film-forming resin and a catalyst associated with a carrier, wherein at least some of the catalyst, upon application of shear force, can be released from the carrier.

In various examples the present invention is further directed to methods of coating a substrate. In examples, the method comprises applying the coating composition to at least a portion of the substrate, wherein the applying imparts shear force to the carrier to release the catalyst from the carrier. In other examples, the method comprises applying shear force to the coating composition and subsequently applying the coating composition to at least a portion of the substrate.

The present invention is also directed to substrates coated at least in part with the coating composition.

DETAILED DESCRIPTION OF THE INVENTION

In examples, the present invention is directed to a coating composition that comprises a film-forming resin and a catalyst associated with a carrier, wherein at least some of the catalyst can be released from the carrier upon exertion of shear force to the carrier.

As used herein the term "film-forming resin" means any of a variety of resins that are designed to undergo chemical reactions under appropriate conditions, such as oxidation, heat, or presence of a suitable co-reactant, catalyst or crosslinking agent. The resin can have functional groups that are reactive with either themselves or another reactive component, such as a crosslinking agent, or both. The film-forming resin may be water-based or solvent-based liquid compositions.

Non-limiting examples of film-forming resins suitable for use with the present invention include (meth)acrylic polymers, polyester polymers, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. Such polymers may be solvent-borne, water-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof. Appropriate mixtures of film-forming polymers or resins may also be used in the preparation of the present coating compositions. For example, the coating compositions can comprise any of a variety of curable compositions known in the art.

The resin can comprise a crosslinker. The crosslinker, or crosslinking resin or agent, can be any suitable crosslinker or crosslinking resin known in the art, and will be chosen to be reactive with the functional group or groups on the film-forming resin. Non-limiting examples of suitable crosslinkers include phenolic resins, amino resins, carbamate resins, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. In certain examples, the crosslinker is a hexamethylene diisocyanate based polyisocyanate. Such crosslinkers are commercially available from Bayer MaterialScience as Desmodur N3400 or 3600.

As mentioned above the coating composition of the present invention includes a catalyst. As used herein, the term "catalyst" refers to a substance that increases the rate of the curing reaction. The catalyst may include metal catalyst, amine catalyst, acid catalyst, ionic liquid catalyst or a combination thereof, as well as other catalysts known in the art. Non-limiting examples of catalysts that are suitable for use with the present invention include those formed from tin, cobalt, calcium, cesium, zinc, zirconium, bismuth, and aluminum as well as metal salts of carboxylic acids, diorganometallic oxides, mono- and diorganometallic carboxylates, and the like. In examples, the metal catalyst comprises calcium naphthanate, cesium naphthanate, cobalt naphthanate, dibutyl tin dilaurate, dibutyl tin diacetate, dibutyl tin dioctoate, and dibutyl tin naphthanate. Suitable amine catalysts include, for example, tertiary amine catalysts, including but not limited to triethylamine, 1,4-diazabicyclo[2.2.2]octane, 1,8-diazabicyclo[5.4.0]undec-7-ene, and N-ethylmorpholine.

The catalyst is associated with a carrier. As used herein, the term "associated with" in reference to the carrier refers to any substance to which a catalyst is coated on, or any substance in which all or part of a catalyst is contained, encapsulated by, hydrogen bonded with, or otherwise non-covalently associated. In an example, the carrier includes a microcapsule shell or encapsulant containing the catalyst in its core. As used herein the terms "microcapsule shell" and "encapsulant" mean a small structure of any shape and texture containing a core or internal space that is enclosed within the structure. In examples the catalyst can be partially encapsulated in the structure such that the structure does not entirely enclose the catalyst within the core. In other examples, the carrier includes a solid matrix type capsule with the catalyst contained entirely or partially therein.

The carrier comprises a material that will protect or isolate the catalyst from initiating a curing reaction with the film-forming resin, and will upon exposure to or application of shear force release some or all of the catalyst. The degree to which the catalyst is effectively protected can be adjusted based upon selection of the associated carrier material. The particle size of the carrier associated with catalyst can also be adjusted to vary the degree of release at a given shear force. For instance, in examples a larger particle size could more readily release catalyst than a smaller particle at the same shear force. The carrier is also selected to be compatible with the film-forming resin. As used herein, the term "compatibility" means the carrier disperses in and remains stable when combined with the film-forming resin; it is not soluble or reactive with the resin prior to exposure to shear force. In examples, the carrier is soluble and/or reactive with the coating composition after exposure to sufficient shear force. Additionally, the carrier is not formed from the film-forming resin or components thereof, but rather comprises a material other than those used in the film-forming resin. In examples of the invention the carrier comprises crosslinked polymer and/or copolymer, and/or copolymer having hydrophilic and hydrophobic character. In certain examples the carrier can be made of gelatin, polyoxymethylene urea formaldehyde, melamine formaldehyde, or polyurethane. In other examples, the carrier comprises silica, such as the use of silica as an encapsulant. In certain examples the carrier is an encapsulant made of a gelatin or polyoxymethylene urea (PMU) formaldehyde shell, and contains a core material consisting of dibutyltin dilaurate (DBTDL) catalyst. Such encapsulants are commercially available from Lipo Technologies, Inc. In examples the carrier is not formed from aromatic polyisocyanate.

In examples, the catalyst comprises 1-99 weight percent of the total solid content of the catalyst and carrier, or in other examples the catalyst comprises 40 to 90 weight percent.

In examples of the invention the coating composition contains more than one type of catalyst. The catalysts can be associated with the same type of carrier or a plurality of different types of carriers.

If desired, the coating compositions can comprise other optional materials known in the art of formulated coatings, such as plasticizers, anti-oxidants, hindered amine light stabilizers, UV light absorbers and stabilizers, surfactants, flow control agents, thixotropic agents such as bentonite clay, pigments, fillers, organic cosolvents, reactive diluents, catalysts, including phosphonic acids, retardants, masking agents, grind vehicles, colorants, abrasion resistant particles and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. A "filler," on the other hand, does not necessarily impart any color and/or opacity and/or other visual effect to the composition.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triaryl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution).

In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at col. 3, line 56 to col. 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting examples, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting example, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting example of the present invention, have minimal migration out of the coating. Example photosensitive compositions and/or photochromic compositions and methods for making them are identified in U.S. Pat. No. 8,153,344 B2, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

The unique nature of coatings comprising a film-forming resin and a catalyst associated with a carrier may enable them to be provided and stored as one-component compositions prior to use because some or all of the catalyst can be isolated from reacting until desired upon application of shear force. A one-component composition will be understood as referring to a composition wherein all the coating components are maintained in the same container after manufacture, during storage, etc. A typical one-component coating can be applied to a substrate and cured by any conventional means, such as by heating, forced air, radiation cure and the like. For some coatings, such as ambient cure coatings, it is not practical to store them as a one-component, but rather they must be stored as multi-component coatings to prevent the components from curing prior to use. The term "multi-component coatings" means coatings in which various components are maintained separately until just prior to application. The present coatings can also be multi-component coatings, such as the two-component coatings described in the background section.

The present invention is further directed to a method of coating a substrate with the coating composition that will exhibit desired workability and/or performance. The method includes applying the composition described herein over at least a portion of a substrate. The composition can be applied in liquid form. The composition can be applied by any means standard in the art that will impart shear force on the carrier in an amount that exceeds the shear strength of the carrier material sufficient to release some or all of the catalyst from the carrier, such as spraying or electrostatic spraying. For instance, shear can be imparted by an atomizer, spray gun, aerosol, or bell applicator and the like or other shear imparting application methods. Alternatively, shear force can be applied to the coating composition and subsequently the coating composition can be applied to a portion of the substrate. In examples the shear force may be applied using a high shear mixing device either as an integral part of the application equipment or process, or as a process preceding application. Shear forces provided by existing application methods can be used, and could support use of any one of many desired binder systems without the need for additional specific processes to release catalyst after application.

When exposed to sufficient shear force, the carrier releases some or all of the catalyst. Once released the catalyst is available to initiate, accelerate, and/or otherwise facilitate cure. By associating the catalyst with a carrier the catalyst can be mixed or dispersed into the composition, and would not react or cure appreciably until it is purposefully released from the carrier. This release of catalyst upon application of shear force can extend the pot life of a curable film-forming composition beyond that which would otherwise be possible by eliminating or at least diminishing the usual inverse relationship of pot life and cure speed. Accordingly, the cure speed can be modified by adjusting the amount of carrier associated catalyst while having no or minimal effect on pot life as compared to traditional freely added catalyst. As shown in the examples, shear from simple mixing or casting a film does not result in the desired release of catalyst, but while spraying, sufficient shear force is exerted to release catalyst from the carrier. Additionally, this concept is further illustrated in the examples wherein an increase in shear force resulted in a greater release of catalyst from the carrier.

Shear force that is considered sufficient will be system dependent. The physical properties of the carrier and the curable formulation in which it is incorporated will significantly control the amount of shear force that is required to induce the desired release. For example, to a certain degree, the total system can be designed to allow low shear mixing for the incorporation of desired components while being sensitive to high shear events that cause release.

The present coatings can be applied to any substrates known in the art, for example, automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil, coiled steel or other coiled metal. Non-metallic substrates include polymeric, plastic, polyester, polyolefin, polyamide, cellulosic, polystyrene, polyacrylic, poly(ethylene naphthalate), polypropylene, polyethylene, nylon, EVOH, poly(lactic acid), other "green" polymeric substrates, poly(ethylene terephthalate) ("PET"), polycarbonate, polycarbonate acrylonitrile butadiene styrene ("PC/ABS"), polyamide, polymer composites, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect.

In examples the dry film thickness may vary as desired. For example, and without limitation, the coating compositions of the present invention can be applied to the substrate at a dry film thickness of 0.1 mils to 50 mils, such as 0.5 to 10 or 1 to 4 mils In other examples, the coatings can be applied to a dry film thickness of 2 mils or greater, 4 mils or greater, 6 mils or greater, 8 mils or greater, 20 mils or greater, or even thicker.

In examples of the invention the coating composition is characterized by a pot-life that is tunable from a potlife of less than one hour, which could result from the use of free catalyst, to a pot-life of four hours and longer based on the presence of free catalyst, catalyst associated with a carrier, and the effectiveness of carrier at isolating the associated catalyst. Thus by adding catalyst that is associated with a carrier, the observed pot-life can be extended beyond that which would be achieved using an equivalent amount of traditionally added free catalyst or catalyst that is not associated with a carrier.

The coating compositions of the present invention can be used alone, as a monocoat coating system. In a monocoat coating system, a single coating layer is applied over a substrate (which can be pretreated or non-pretreated) that can comprise one or more of the following layers: an electrodepositable coating layer or a primer-surfacer coating layer. Alternatively they can be used as part of a coating system that can be deposited onto the different substrates that are described herein. Such a coating system typically comprises a number of coating layers, such as two or more. A coating layer is typically formed when a coating composition that is deposited onto the substrate is substantially cured. The coating compositions described above can be used in one or more of the coating layers described herein. The coatings can comprise a colorant or not and can be used as a primer, basecoat, and/or top coat, or monocoat. Accordingly, the present invention is further directed to a substrate coated at least in part with any of the coating compositions described herein.

In certain examples, the coating is a clearcoat. A clearcoat will be understood as a coating that is substantially clear or transparent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coating art.

In certain examples, the coating is a primer. Generally, a primer promotes adhesion of subsequently applied coatings to the substrate, protects the substrate, such as from corrosion or UV exposure, improves surface smoothness and is often designed to be sandable. Primers according to the present invention can comprise some colorant and will typically be used with one or more additional coating layers such as after an electrocoat layer or before a primer surface layer, a colored basecoat layer, a clearcoat layer and the like.

In certain examples, the coating is a basecoat. A basecoat is typically pigmented; that is, it will impart some sort of color and/or other visual effect to the substrate to which it is applied.

In certain examples of a coating system, a clearcoat is deposited onto at least a portion of a basecoat coating layer. In such examples, the substantially clear coating composition can comprise a colorant but not in an amount such as to render the clear coating composition opaque (not substantially transparent) after it has been cured. In certain instances, the BYK Haze value of the cured composition is less than 50, can be less than 35, and is often less than 20 as measured using a BYK Haze Gloss meter available from BYK Chemie USA.

In certain other examples, the coating comprises a colorant, such as a pigmented basecoat used in conjunction with a clearcoat or as a pigmented monocoat. Such coating layers are used, for example, in the automotive industry to impart a decorative and/or protective finish to the coated substrate. Accordingly, the present invention is further directed to a substrate coated at least in part with the coating of the present invention, wherein the substrate comprises part of a vehicle. "Vehicle" is used herein in its broadest sense and includes all types of vehicles, such as but not limited to cars, trucks, buses, vans, golf carts, motorcycles, bicycles, railroad cars and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like. Clearcoats will typically be applied to the exterior of a vehicle.

The coating compositions of the present invention can be used in any application appropriate for a curable coating composition. They can be useful in applications where ambient curable compositions are desired to exhibit a longer pot life. For example, the coatings are particularly suitable for use in the automotive industry. In a conventional coating system used in the vehicle refinish industry, many coatings are provided as multiple components because once mixed, the reaction proceeds and the reactive coating has a limited pot life. Curable coatings of this invention, that utilize a catalyst associated with a carrier, allow for coatings having longer pot life thus leading to increased productivity in coating application. This could further provide for improved coating physical properties and/or appearance. In examples the catalyst is isolated from the rest of the coating until it is needed during or after application. However, while it is anticipated that the present curable coating composition can have multiple varied uses, it is not however an adhesive, and would not be expected to work in joining two substrates to form a structural connection or bond.

For purposes of the above detailed description, it is to be understood that the invention may assume various alternative variations and step sequences, except where expressly specified to the contrary. Moreover, other than in any operating examples, or where otherwise indicated, all numbers expressing ranges, amounts or percentages, for example, quantities of ingredients, used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include the endpoints of those ranges and all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent. For example, although reference is made herein to "a" catalyst, "a" film-forming resin and the like, one or more of each of these components, and of any other components, can be used. Singular encompasses plural and vice versa, unless specifically stated otherwise. In addition, in this application, the use of "or" means "and/or" unless specifically stated otherwise, even though "and/or" may be explicitly used in certain instances. As used herein, the term "polymer" refers to oligomers and both homopolymers and copolymers, and the prefix "poly" refers to two or more. "Including," "for example," "such as" and like terms means including, for example, such as, but not limited to.

The various examples and examples of the present invention as presented herein are each understood to be non-limiting with respect to the scope of the invention.

The invention will be further described by reference to the following examples. The following examples are merely illustrative of the invention and are not intended to be limiting.

EXAMPLES

The following examples are presented to demonstrate the general principles of the invention. The Examples describe the preparation of coating compositions according to examples of the present invention and compare them to analogous compositions that do not contain the materials and/or meet the parameters of the composition. All amounts listed are described in parts by weight, unless otherwise indicated. The invention should not be construed as limited to the specific examples presented.

Preparation of a coating composition containing gelatin catalyst capsules (Formula A):

The following ingredients were added to a mixing cup: 52.8 g ECW8186 waterborne clearcoat and 21.15 g EHW8224 waterborne clearcoat hardener (both commercially available from PPG Industries, Inc.) were added together and mixed thoroughly by hand. Then, 21.15 g T494 waterborne thinner (commercially available from PPG Industries, Inc.), and 3.3 g gelatin catalyst capsule provided as an aqueous slurry (supplied by Lipo Technologies, Inc.) were added and mixed thoroughly by hand. The gelatin capsules were 20 wt % solids and dibutyltin dilaurate (DBTDL) comprised 72.7 wt % of the total solid content.

Preparation of a coating composition containing PMU catalyst capsules (Formula B):

The following ingredients were added to a mixing cup: 52.8 g ECW8186 waterborne clearcoat and 21.15 g EHW8224 waterborne clearcoat hardener (both commercially available from PPG Industries, Inc.) were added together and mixed thoroughly by hand. Then, 21.15 g T494 waterborne thinner (commercially available from PPG Industries, Inc.), and 3.65 g polyoxymethylene urea (PMU) formaldehyde capsule provided as an aqueous slurry (supplied by Lipo Technologies, Inc.) were added and mixed thoroughly by hand. The capsules were 23 wt % solids and DBTDL comprised 57.1 wt % of the total solid content.

Similar preparations with no catalyst or free DBTDL were also prepared and evaluated as comparative examples as outlined in Table 1.

TABLE 1

Coating formulations (mass in grams).

| Ingredient | Comparative 1 | Comparative 2 | A | B |
|---|---|---|---|---|
| ECW8186 | 52.8 | 52.8 | 52.8 | 52.8 |
| DBTDL | 0 | 0.48 | 0 | 0 |
| Gelatin catalyst capsule[1] | 0 | 0 | 3.3 | 0 |
| PMU catalyst capsule[2] | 0 | 0 | 0 | 3.65 |
| EHW8224 | 21.15 | 21.15 | 21.15 | 21.15 |
| T494 | 21.15 | 21.15 | 21.15 | 21.15 |

[1]From Lipo Technologies, Inc.
[2]From Lipo Technologies, Inc.

To evaluate the effect of the encapsulated catalyst on pot life, coating viscosity was measured over time. Konig pendulum hardness and dust-free time were measured after coating application to evaluate the effect of the encapsulated catalyst on cure of the coating as applied to a substrate.

The formulas of the Examples were spray applied to electrocoated steel panels. The panels used were ACT cold rolled steel panels (10.16 cm by 30.48 cm) with ED6060 electrocoat available from ACT Laboratories, Inc. The coating compositions were each hand sprayed using a HVLP spray gun with a 0.3 mm and a 1.1 mm nozzle at ambient temperature in two coats with an ambient flash between applications. Clearcoats were targeted for a 1 to 2 mils (about 25 to 51 micrometers) dry film thickness.

Some of the physical properties of the compositions are summarized below in Table 2:

TABLE 2

| | | Comparative 1 | Comparative 2 | A | B |
|---|---|---|---|---|---|
| Viscosity[1] at time indicated (cP) | Initial | 28.5 | 25 | 23.1 | 20.8 |
| | 15 min | 24.8 | 20.6 | 20.2 | 18.3 |
| | 30 min | 23.1 | 35.2 | 19 | 16.5 |
| | 45 min | 22.7 | gel | 18.5 | 16.2 |
| | 60 min | 22.1 | gel | 19.2 | 18.5 |
| | 300 min | 53.4 | gel | 37.9 | 50.6 |
| Gel time | | 7+ hrs | 30-45 min | 7+ hrs | 7+ hrs |
| Dust-free time with 0.3 mm nozzle (min)[2] | | —[3] | —[3] | 45 | 45 |

TABLE 2-continued

| | Comparative 1 | Comparative 2 | A | B |
|---|---|---|---|---|
| Dust-free time with 1.1 mm nozzle (min)[2] | 90 | 30 | 75 | 60 |
| 96 hr Konig with 1.1 mm nozzle (sec) | 56 | 71 | 115 | 84 |

[1]Measured on Brookfield CAP 2000 viscometer with #1 spindle at 900 RPM.
[2]The time at which no cotton fibers adhere to the coating surface after placing a cotton ball on the surface. Measured at 15 min intervals.
[3]Comparative examples were not tested using a 0.3 mm nozzle.

It can be seen from the viscosity measurements over time that the encapsulated catalyst of Formulas A and B significantly extends the pot life of the formula as compared to the traditional free catalyst of the Comparative 2 formula. In fact, the pot-lives of Formulas A and B are very similar to Comparative 1 that has no catalyst added. Upon spray application, the dust-free times are shorter and the hardnesses are higher in Formulas A and B as compared to no catalyst of Comparative 1, indicating that catalyst is released during spray application. Although the dust-free time is longer than the free catalyst system of Comparative 2, there is an obvious benefit as compared to no catalyst. Encapsulated catalyst allows for the novel combination of extended pot-life, as seen with no catalyst, with the dust-free time and hardness more like a traditionally catalyzed system to be realized. The use of encapsulated catalyst released by application avoids or diminishes the typically observed compromise between pot-life and cure time.

Additionally, it can be seen that application with a smaller nozzle size, effectively increasing the shear force, leads to shorter dust-free time. The reduced dust-free time is indicative of enhanced release of catalyst from the carrier demonstrating the role of shear force and release of a catalyst from a carrier.

Whereas particular examples of this invention have been described above for purposes of illustration, it will be evident to those skilled in the art that numerous variations of the details of the present invention may be made without departing from the invention as defined in the appended claims. It is understood, therefore, that this invention is not limited to the particular examples disclosed, but it is intended to cover modifications that are within the spirit and scope of the invention, as defined by the appended claims.

The invention claimed is:

1. A method of coating a substrate comprising:
   applying a sprayable coating composition to at least a portion of a substrate, wherein the coating composition comprises:
   (a) a curable water-borne or solvent-borne film-forming resin; and
   (b) a catalyst coated on, hydrogen bonded with, contained within or encapsulated by a carrier, said carrier comprising gelatin, polyoxymethylene urea formaldehyde, melamine formaldehyde, or silica;
   wherein said applying is conducted to impart shear force to the carrier, which thereby releases the catalyst from the carrier, and upon application of the shear force, at least some of the catalyst is released from the carrier, and wherein the carrier is not formed from the film-forming resin (a).

2. The method of claim 1, wherein increasing the shear force applied to the carrier increases the amount of catalyst that is released.

3. The method of claim 1, wherein the shear force is induced by an atomizer or spray gun.

4. The method of claim 1, wherein the catalyst is contained within or encapsulated by the carrier.

5. The method of claim 1, wherein the carrier is selected from:
 (a) gelatin or
 (b) polyoxymethylene urea formaldehyde.

6. A method of coating a substrate comprising:
 spraying a coating composition onto at least a portion of a substrate, wherein the coating composition comprises:
  (a) a curable water-borne or solvent-borne film-forming resin; and
  (b) a catalyst contained within or encapsulated by a carrier, said carrier comprising gelatin, polyoxymethylene urea formaldehyde, melamine formaldehyde, or silica;
 wherein said spraying is conducted by an atomizer or spray gun that imparts shear force to the carrier and thereby releases the catalyst from the carrier, and upon application of the shear force, at least some of the catalyst is released from the carrier, and wherein the carrier is not formed from the film-forming resin (a).

7. The method of claim 6, wherein increasing the shear force applied to the carrier increases the amount of catalyst that is released.

8. The method of claim 6, wherein the carrier is selected from:
 (a) gelatin or
 (b) polyoxymethylene urea formaldehyde.

9. The method of claim 6, wherein the coating composition is applied on the substrate as a primer, basecoat, monocoat, or clearcoat, and imparts a decorative and/or protective finish to the substrate.

10. The method of claim 9, wherein the substrate is part of a vehicle.

* * * * *